(12) United States Patent
Wang et al.

(10) Patent No.: US 12,262,290 B2
(45) Date of Patent: Mar. 25, 2025

(54) BUILDING STRESS BALANCE MONITORING SYSTEM OF PASSIVE SENSOR NETWORK

(71) Applicant: DALIAN UNIVERSITY, Dalian (CN)

(72) Inventors: Zumin Wang, Dalian (CN); Zupeng Zheng, Dalian (CN); Changqing Ji, Dalian (CN); Jing Qin, Dalian (CN)

(73) Assignee: DALIAN UNIVERSITY, Dalian (CN)

( * ) Notice: Subject to any disclaimer, the term of this patent is extended or adjusted under 35 U.S.C. 154(b) by 328 days.

(21) Appl. No.: 17/773,869

(22) PCT Filed: Nov. 4, 2019

(86) PCT No.: PCT/CN2019/115238
§ 371 (c)(1),
(2) Date: May 3, 2022

(87) PCT Pub. No.: WO2021/087641
PCT Pub. Date: May 14, 2021

(65) Prior Publication Data
US 2022/0417713 A1    Dec. 29, 2022

(51) Int. Cl.
*H04W 4/38*    (2018.01)
*H04L 43/02*   (2022.01)
(Continued)

(52) U.S. Cl.
CPC ............. *H04W 4/38* (2018.02); *H04W 40/10* (2013.01)

(58) Field of Classification Search
None
See application file for complete search history.

(56) References Cited

U.S. PATENT DOCUMENTS

| 9,446,636 B2 * | 9/2016 | Deniau | B60C 23/0479 |
| 2011/0080349 A1 * | 4/2011 | Holbein | G06F 1/3203 |
| | | | 345/212 |

(Continued)

FOREIGN PATENT DOCUMENTS

| CN | 102288345 A | 12/2011 |
| CN | 104614103 A | 5/2015 |
| CN | 105403421 A | 3/2016 |

OTHER PUBLICATIONS

International Search Report and Written Opinion issued in corresponding International Application No. PCT/CN2019/115238; Aug. 5, 2020; 12 pgs.

(Continued)

*Primary Examiner* — Sai Aung
(74) *Attorney, Agent, or Firm* — HAUPTMAN HAM, LLP

(57) ABSTRACT

The building stress balance monitoring system of the passive sensor network, relating to the technical field of information, and aiming to solve the problem of making the pressure sensor easier to be charged in building stress monitoring. The system includes plurality of nodes arranged in the same building surface of the building or arranged in the supporting surface of the bridge; each node mainly consists of the pressure sensor module, the radio frequency signal acquisition module, and the network module; the sensing surface of the pressure sensing module acquires building pressure information and transmits same to the pressure sensor module; the pressure sensor module receives electric energy provided by the radio frequency signal acquisition module, and converts the pressure information into data, which can be uploaded to the network through the network module. The effect of making the pressure sensor easier to be charged is achieved.

9 Claims, 6 Drawing Sheets

(51) Int. Cl.
*H04W 40/10* (2009.01)
*H04W 52/02* (2009.01)

(56) References Cited

U.S. PATENT DOCUMENTS

| | | | |
|---|---|---|---|
| 2016/0016445 A1* | 1/2016 | Peine | B60C 23/0459 |
| | | | 73/146.5 |
| 2017/0297866 A1* | 10/2017 | Fauconnet | B66B 5/0087 |
| 2018/0087984 A1* | 3/2018 | Hagelin | G01L 1/146 |
| 2019/0069053 A1* | 2/2019 | Laguduwa | H04Q 9/00 |
| 2019/0255893 A1* | 8/2019 | Van Wiemeersch | |
| | | | B60C 23/0479 |

OTHER PUBLICATIONS

Varghese, Jobin et al.; "Dynamic Duty-Cycled MAC for Wireless Sensor Networks with Energy Harvesters"; Proceedings of International Conference on Circuits, Communication, Control and Computing; Nov. 22, 2014; pp. 156-160.

Yu Shu-Ying, et al.; "Wireless Sensor Networks for Bridge Structural Health Monitoring"; Journal of Software; Jun. 15, 2015; pp. 1486-1498 (see English Abstract).

First Office Action issued in corresponding Chinese patent application No. 201911065889.0; mailed Nov. 11, 2021; 12 pgs.

* cited by examiner

BUILDING STRESS BALANCE MONITORING SYSTEM OF PASSIVE SENSOR NETWORK

RELATED APPLICATIONS

The present application is a U.S. National Phase of International Application Number PCT/CN2019/115238, filed Nov. 4, 2019.

TECHNICAL FIELD

The present invention relates to the technical field of information, and relates to the building stress balance real-time monitoring system based on the passive sensor network.

BACKGROUND

In the aspect of building safety inspection, the X-ray method, the eddy current method, the optical diagnosis method, etc. are commonly used in China at first. These methods are to determine the safety status of the whole building by means of local building inspection, but this inspection method has great shortcomings. As the development of information technology, fiber optic communication technology is used by people later to inspect buildings remotely. However, the method has limitations in terms of areas of use and performance. Afterwards, people start to use wireless sensors mounted and arranged on the bridge structure to detect healthy conditions thereof. However, the sensors are arranged in the whole bridge structure, if the bridge structure is small, it is fine, but if the bridge structure is large, the large number of sensors needs to be arranged. Now many researchers apply wireless sensors to buildings to detect building information periodically, and compared with some previous methods, the accuracy of data and overall performance are improved. However, the conventional wireless sensors are powered by batteries, and once the batteries of the sensors run out of power, the sensor network cannot operate. Moreover, in the later battery replacement process, the lot of manpower and material resources are needed, replacement of lots of batteries also causes environmental pollution, and long-term replacement also causes waste of the lot of money.

SUMMARY

In order to solve the problem of making the pressure sensor easier to be charged in building stress monitoring, the present invention proposes to enable the pressure sensor to receive electric energy provided by the radio frequency signal acquisition module, so that the pressure sensor is charged by means of radio frequency without performing battery replacement, thereby facilitating power supply. In order to achieve the purpose, the technical solution of the present invention is as follows.

A building stress balance monitoring system of the passive sensor network, including a plurality of nodes arranged in the same building surface of the building or arranged in the supporting surface of the bridge, where each of the nodes mainly consists of the pressure sensor module, the radio frequency signal acquisition module, and the network module; the sensing surface of the pressure sensing module acquires building pressure information and transmits same to the pressure sensor module, the pressure sensor module receives electric energy provided by the radio frequency signal acquisition module, and converts the pressure information into data, which can be uploaded to the network by means of the network module; if electric capacity of the radio frequency signal acquisition module is less than the set threshold, the pressure sensor module enters the sleep state, and the radio frequency signal acquisition module acquires the radio frequency signal and converts same into electric energy; when stored electric energy reaches the high set threshold, the pressure sensor module switches from the sleep state to the active state and can perform data acquisition or transmission.

Furthermore, each of the nodes has the pebble-shaped housing, each module is located in the housing, and the sensing surface of the pressure sensing module is part or all of the top surface of the pebble-shaped housing; the pressure sensing module and the pressure sensor module are connected and perform signal transmission by means of the data transmission rod.

Furthermore, the system executes the time synchronization method for data transmission between the nodes, so that two adjacent nodes are woken up synchronously, data can be transmitted between the two adjacent nodes, and a role conversion method is used for data transmission between the two adjacent nodes.

The beneficial effects: in the present invention, the pressure monitoring system having the passive pressure sensor is made into "smart pebbles" (the housing is of the pebble shape), and is embedded into the building, the stress on the supporting interface of each building in building construction and bridge construction is monitored in real time, the system can immediately give the alarm when the stress in the certain area of the building is seriously beyond the stress range thereof, and the early-warning indicator light flickers to give the alarm. The waste of battery energy of the sensor is reduced while achieving monitoring the stress on the main supporting interface of the building in real time, thereby effectively improving quality safety of the building. The monitored area can be monitored all days without blind spots. The limitations of using existing sensors in buildings are overcome.

BRIEF DESCRIPTION OF THE DRAWINGS

FIGS. 5(a) and 5(b) are the schematic diagram of the role conversion mechanism, wherein FIG. 5(a) is the data transmission diagram, and FIG. 5(b) is the role switching diagram executed in the continuous working cycles by the nodes;

FIGS. 6(a)-6(c) are the node arrangement diagram, wherein FIG. 6(a) is the structural diagram of the bridge portion, FIG. 6(b) is the support network arrangement diagram, and FIG. 6(c) is the road surface network arrangement diagram;

FIGS. 7(a)-7(d) are tree network topology routing diagram, wherein FIG. 7(a) is the support network routing diagram, FIG. 7(b) is the road surface network routing diagram, FIG. 7(c) is the bridge overall network routing diagram, and FIG. 7(d) is the overall network routing diagram;

Figure 1:
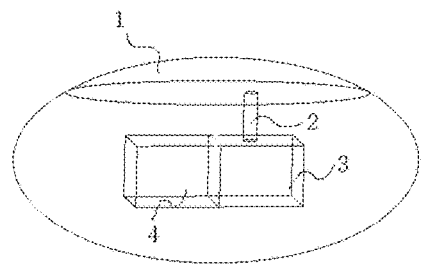
FIG. 1 is the structural schematic diagram of the building stress balance monitoring system of the passive sensor network.

1. pressure sensing module, 2. data transmission rod, 3. pressure sensor module, 4. radio frequency signal acquisition module, 5. early-warning indicator light, 6. road surface node network, 7. bridge surface, 8. support node network, 9. supporting rod, 10. capacitor, 11. power cord, and 12. smart pebble.

DETAILED DESCRIPTION

Example 1: the building stress balance monitoring system of the passive sensor network, including a plurality of nodes arranged in the same building surface of the building or arranged in the supporting surface of the bridge, where each node mainly consists of the pressure sensor module, the radio frequency signal acquisition module, and the network module. The sensing surface of the pressure sensing module acquires building pressure information and transmits same to the pressure sensor module, the pressure sensor module receives electric energy provided by the radio frequency signal acquisition module, and converts the pressure information into data, which is uploaded to the network by means of the network module. If electric capacity of the radio frequency signal acquisition module is less than the set threshold, the pressure sensor module enters the sleep state, and the radio frequency signal acquisition module acquires the radio frequency signal and converts same into electric energy, and when stored electric energy reaches the high set threshold, the pressure sensor module switches from the sleep state to the active state and performs data acquisition or transmission.

Furthermore, the node has the pebble-shaped housing, each module is located in the housing, and the sensing surface of the pressure sensing module is part or all of the top surface of the pebble-shaped housing.

Furthermore, the pressure sensing module and the pressure sensor module are connected and perform signal transmission through the data transmission rod.

Furthermore, the building stress balance monitoring system of the passive sensor network wherein the time synchronization method for data transmission between the nodes is performed, so that two adjacent nodes are woken up synchronously, and data can be transmitted between the two adjacent nodes.

Furthermore, data transmission is performed between the two adjacent nodes by using the role conversion method.

As the preferred solution, the solution may also be taken as the independent solution to implement the method of data transmission between two adjacent nodes, i.e., the node data transmission method. The two adjacent nodes are synchronously woken up by using the time synchronization method, the two adjacent nodes are time-synchronized, and after the wake-up, the node determines its data cache; if:

situation 1: the data cache of the node is less than the threshold, the node acts as the parent node, collects data without transmitting same, and calculates whether remaining energy of the node can collect data and make the data cache greater than the threshold;

if the remaining energy cannot be maintained until the data cache is greater than the threshold, calculate a next synchronization wake-up time of the node and a child node adjacent to the node, and when the node runs out of energy, the node enters the sleep state and waits for next time synchronization wake-up; and if the remaining energy can be maintained until the data cache is greater than the threshold, then calculate the next synchronization wake-up time of the node and the parent node adjacent to the node, and during this wake-up, if the data cache is greater than the threshold, the node is converted into the child node, transmitting data without collecting data, and when the node runs out of energy, the node enters the sleep state, and waits for the next time synchronization to wake-up;

situation 2: the data cache of the node is greater than the threshold, the node acts as a child node, transmits data without collecting data, and calculates whether the remaining energy of the node can transmit the data in the data cache until the data cache is less than the threshold;

if the remaining energy of the node cannot be maintained until the data cache is less than the threshold, calculate the next synchronous wake-up time of the node and a parent node adjacent to the node, when the node runs out of energy, the node enters the sleep state, and waits for the next time synchronization to wake-up; and if the remaining energy can be maintained until the data cache is greater than the threshold, calculate the next synchronous wake-up time of the node and the child node adjacent to the node, and during this wake-up, if the data cache is less than the threshold, the node is converted to the parent node collecting data without transmitting data, and when the node runs out of energy, the node enters the sleep state, and waits for the next time synchronization to wake-up;

As the preferred solution, the solution may also be taken as the independent solution to implement time synchronization wake-up between two nodes, i.e., the time synchronization method: there are two situations between adjacent parent and child nodes: one is that the superframe size of the child node is greater than that of the parent node, and the other one is that the superframe size of the parent node is greater than that of the child node. The adjustment method includes: changing the superframe size in one node, and keeping the superframe size unchanged in the other node, to achieve time synchronization of the two nodes.

Furthermore, the synchronization method for the first situation is that: when the charging rate of the child node is quicker than that of the parent node, the size of the child superframe is smaller than that of the parent superframe, the beacon message including information about superframe time of the parent node is received from the parent node, and is used to determine start time of the next frame of the parent node. When beacon information is received, the child node uses the beacon information to adjust the superframe thereof, such that start time of the frame of the child node is aligned with that of the parent node. A duty cycle is added at the end of the child superframe to extend same, and within the duty cycle of this extension, the child node wakes up and starts to consume a predetermined amount of energy, and then returns to the sleep state and starts charging again, so that the energy at the beginning of the duty cycle is equal to the energy at the end of the duty cycle, the superframe sizes of the parent and child nodes are equal, and the nodes are time-synchronized.

Furthermore, the method for calculating the time when the child node to wake up and start to consume the predetermined amount of energy is that: before the child node receives the beacon message, the beacon message has been transmitted in the frame for n*t time, Tc is the time taken to consume energy, n is an operation cycle, and t is the time of each cycle; Tc is calculated as follows: T1 is remaining time in the current frame, T2 is sleep time in the duty cycle, T3 is time occupied by a secondary duty cycle, T3 is the sum of time Tc and Th, Tc is time taken to consume some energy, Th is time needed to collect the energy, and time Tparent taken for the parent node to start the next frame is the sum of T1, T2, and T3, i.e., $$T1+T2+T3=T\text{parent}$$

then: $T1+T2+Tc+Th=T\text{parent}$  formula (1)

Energy consumed within the secondary duty cycle or adjustment time has to be equal to the energy harvested within the same duty cycle, i.e.: Ec=Eh, Tc*Rc=Th*Rh $$Th = \frac{Tc*Rc}{Rh} \quad \text{formula (2)}$$

formula (1) is brought into Th to obtain:

$$T1+T2+Tc+\frac{Tc*Rc}{Rh}=T\text{parent} \quad \text{formula (3)}$$

The total time taken by the child node in the current superframe is equal to the sum of time the child node has spent, the time remaining in the current wake-up state, and the time needed for the child node to be fully charged:

$$T1+T2+(n*t)=T\text{child} \quad \text{formula (4)}$$

Formula (3) is brought into formula (4) to obtain:

$$T\text{child}-(n*t)+Tc+\frac{Tc*Rc}{Rh}=T\text{parent}$$

$$Tc*\left\{1+\frac{Rc}{Rh}\right\}=T\text{parent}-T\text{child}+(n*t)$$

$$Tc*\left\{\frac{Rh+Rc}{Rh}\right\}=T\text{parent}-T\text{child}+(n*t)$$

The following formula is obtained after arrangement:

$$Tc = \frac{T\text{parent}-T\text{child}+(n*t)}{Rh+Rc}*Rh \quad \text{formula (5)}$$

Furthermore, the synchronization method for the second situation is that: when the charging rate of the child node is slower than that of the parent node, the size of the child superframe is larger than that of the parent superframe. When beacon information is received, the child node has passed n*t time of the frame, and left some energy. Calculating how long the child node should continue the current frame to align the child node to the parent node, and the child node is aligned to the parent node by shrinking the duty cycle of the child node.

Furthermore, the method for calculating how long the child node needs to continue the current frame to align the child node to the parent node is: T1 is time for the child node to continue the current frame and consume energy, and T2 is time needed for the child node to fully charge. T1 is calculated as follows:

$$T1+T2=T\text{parent} \quad \text{formula (6)}$$

When the beacon message is received from the parent node, the remaining energy in the child node is calculated from energy consumed by the child node in the current frame, and expressed by the following formula:

$$E\text{left}=E\text{full}-(n*t)*Rc \quad \text{formula (7)}$$

The sum of the energy consumed and harvested and the remaining energy of the child node must equal to full charge, i.e.:

$$E\text{full}=E\text{left}-(T1*Rc1)+(T2*Rh1) \quad \text{formula (8)}$$

Formula (7) is brought therein to obtain:

$$E\text{full}=\{E\text{full}-(n*t)*Rc\}-(T1*Rc1)+(T2*Rh1)$$

$$T1*Rc1=(T2*Rh1)-((n*t)*Rc)$$

Formula (6) is brought therein, to obtain:

$$T1*Rc1=\{(T\text{parent}-T1)*Rh1\}-((n*t)*Rc)$$

$$T1*\{Rc1+Rh1\}=(T\text{parent}*Rh1)-((n*t)*Rc)$$

$$T1 = \frac{\{(T\text{parent}*Rh1)-((n*t)*Rc)\}}{Rc1+Rh1}. \quad \text{formula (9)}$$

where n is the number of periods of operation, t is time per cycle, Ec is energy that is consumed, Eh is energy that is harvested, Rh is the energy harvesting rate, Rc is the energy consumption rate, Eleft is the remaining energy, and Efull is the total energy, Tchild is the total time taken by the child node in the current superframe, Rc1 is the energy consumption rate for the child node to continue the current frame, and Rh1 is the energy harvesting rate for the child node to continue the current frame.

As the preferred solution, the solution may also be taken as the independent solution which can implement role conversion of the node, and when the role switches and returns to the original role, data can be continuingly transmitted:

a node sending data is the child node, the node receiving the data is to send the data from the first node to the third node, the first node must forward the data to the second node, the second node stores the data in the buffer area, then the second node transfers the data to the third node, as the continuous message stream, the data can only be transferred to one node at the time, and the second node has two different roles in data transfer, i.e., the parent node and the child node.

First, the second node is the parent node role which receives the data packet sent out by the first node which acts as the child node.

Then the second node converts the role thereof into the child node, and forwards the data packet to the third node which acts as the parent node.

During the process, the second node performs role conversion in the process, the second node plays one of the two roles in different time according to specific conditions, and determines the role that the second node currently needs to play according to the size of the buffer area of the second node.

When the space of the buffer area in the second node is free and able to receive data from other nodes, the second node acts as the parent node, and receives data transmitted by the child node thereof, and when the buffer area of the second node is full and cannot receive more data packets, the second node acts as the child node, and the second node which acts as the child node sends data to the parent node, so as to release the space of the buffer area.

Furthermore, when the buffer area of the second node reaches 80% of full capacity, the second node switches from the parent node role to the child node role, and when the buffer area of the second node reaches 10% of full capacity, the second node switches from the child role to the parent role.

Furthermore, the reference point is fixed in the time dimension when the node acts as the parent node, and after the node is converted from the parent node into the child node, the original child node of the node may still wait to communicate with same, and the node needs to record the frame shift thereof, and re-adjusts itself to return to the reference point thereof, so as to switch back to the original role of the parent node, and re-communicate with the original child node. The method for calculating the frame shift is that:

$$Shift = Minimum\ Duty\ Cycle\ Time - Total\ Frame\ Shifts$$

Shift is the shift of movement when the child node is converted into the parent node, Minimum Duty Cycle Time is the minimum operating period, and Total Frame Shifts is total adjustment time.

As the preferred solution, the solution may also be taken as the independent solution. The synchronous transmission method for multi-node distributed pressure acquisition data of the building includes the following steps.

At S1, arranging the nodes in the building, and constructing a network routing.

At S2, obtaining state and energy usage information of each node, realizing time synchronization for two adjacent nodes, and transmitting data through a role conversion.

Furthermore, the method for arranging the nodes includes the following steps: the nodes are arranged in the same building surface of the building or the nodes are arranged in multiple areas in the supporting surface of the bridge, the nodes are evenly arranged when the nodes are arranged in the same area, and distances between adjacent nodes are kept consistent, where the supporting surface of the bridge includes the supporting surface of the bridge support and the bridge span road surface, and more nodes are distributed on the supporting surface of the bridge support. For one area in which the nodes are arranged, there is the area in which the nodes are arranged symmetrically to the nodes arranged in the area, and node arrangement surfaces are symmetrical on the whole, so that the data comparison can be performed on whether the symmetrical areas have balanced pressure;

Furthermore, the method for constructing the tree-shaped network routing for the bridge is that: for the routing constituted by the nodes on the bridge support, the name of each node on the routing is constituted by the support number-a support code-a node number. The bridge includes multiple bridge supports, and for the routing constituted by road surface nodes between every two adjacent supports, the name of each node on the routing is constituted by the road surface number-a road surface code-a node number. All the supports and all the road surfaces form the large network as shown in the drawings to form the overall routing;

Furthermore, stress analysis is performed on the whole bridge by means of data transmitted by means of the network of each bridge support and road surface, and according to the established network routing, the node transmits the data by means of the routing to the management platform.

Furthermore, the node in the certain network transmits data to the network routing, then transmits by means of the parent routing on the routing network, always transmits upwards, and finally transmits to the management platform by means of the sink node and the Internet for stress analysis.

Furthermore, the state of each node is obtained, and the state includes the sleep/wake-up state and the energy usage state. After the network is formed, the nodes need to learn information of adjacent nodes, which is obtained by sending out the information signal. The operation of the nodes is performed in the wake-up state, the nodes in the network have respective data transmission slot numbers, and each operation period is allocated according to the number of hops of the routing for data transmission between the nodes.

Furthermore, the method for performing data transmission between the nodes includes the following steps: first the nodes acquire stress information, then the stress information is stored into the local cache, and the synchronization period of neighbor nodes is sensed. By means of time synchronization, according to the size of data of the nodes and the spacing of the neighbor nodes, whether remaining energy of the current node can satisfy the requirement for energy consumed by processing the data by the node is determined, and according to whether data in the cache area reaches the threshold, data transmission is performed between the nodes by using the role conversion method. The specific transmission method of the method for performing data transmission between the nodes is the method for performing data transmission between the nodes in the examples.

Furthermore, step S3 is further included, the early-warning and alarm after stress analysis of the bridge: early-warning indicator light systems are provided at entrances of two ends of the bridge and at positions on two sides of each section of the road surface, each early-warning indicator light system mainly consisting of the early-warning indicator light. The radio frequency signal acquisition module acquires the radio frequency signal, the radio frequency signal is converted into electric energy, the connection is made to the capacitor by means of the power cord, and the electric energy is stored into the capacitor. When it is detected that the power of the capacitor is lower than the certain storage capacity, the node performs energy harvesting, and if it is detected that the stored power of the capacitor is full, the node enters the sleep state without acquiring the radio frequency signal. The purpose is that the early-warning indicator light needs to maintain one stable and longer-time power supply, and therefore, radio frequency power is stored and supplied, so as to improve the stability of power supply. Data acquisition and transmission of the pressure sensor are instantaneous, so that real-time supply can meet their needs. Moreover, the early-warning indicator light system receives the analysis result given by the management platform and warning information of the road surface network, and if the part of the road surface is overloaded, the light alarm is given. The early-warning indicator light is supported by the supporting rod, the early-warning indicator light system is connected to the capacitor by means of the power cord, the supporting rod is connected to the housing inside which the capacitor is mounted, and the housing forms supporting of the bottom.

Furthermore, the early-warning includes:

a support early-warning: first, the nodes (smart pebbles may be selected) on two ends of the same support perform stress acquisition, and by comparing the acquired stress with pressure that the support can bear, whether load-bearing stress is overloaded is determined. If the stress is overloaded, the overloading warning is uploaded to the management end, and the early-warning indicator lights on the two ends of the support turn yellow. If the stress is overloaded continuingly, the early-warning indicator lights turn red, and the data is uploaded to the management end for processing. If the stress of other supports is balanced (within the normal range), the lights turn green.

Road surface early-warning: data on the same section of road surface is detected, if the certain side or the certain area on the road surface is overloaded, the early-warning indicator lights on two ends of the road surface turn yellow, and if the stress is overloaded continuingly, the early-warning indicator lights turn red, and the data is uploaded to the management end for processing.

Early-warning at two ends of the bridge: if the stress of the certain section of support or road surface network is overloaded continuingly, the early-warning lights on two sides of the bridge turn red, the driver can know according to the early-warning lights that the bridge is overloaded, and then is prohibited to drive on the bridge, so as to avoid the danger of bridge damage caused by stress overload.

Furthermore, the acquired data can be used for bridge usage prediction, data uploaded by each support network and road surface network is stored, the data is analyzed by means of big data technology to obtain the change diagram of the stress on the bridge, the service life of the bridge can be predicted, such that dangerous accidents caused by long-term usage of the bridge can be prevented in advance.

Figure 9:
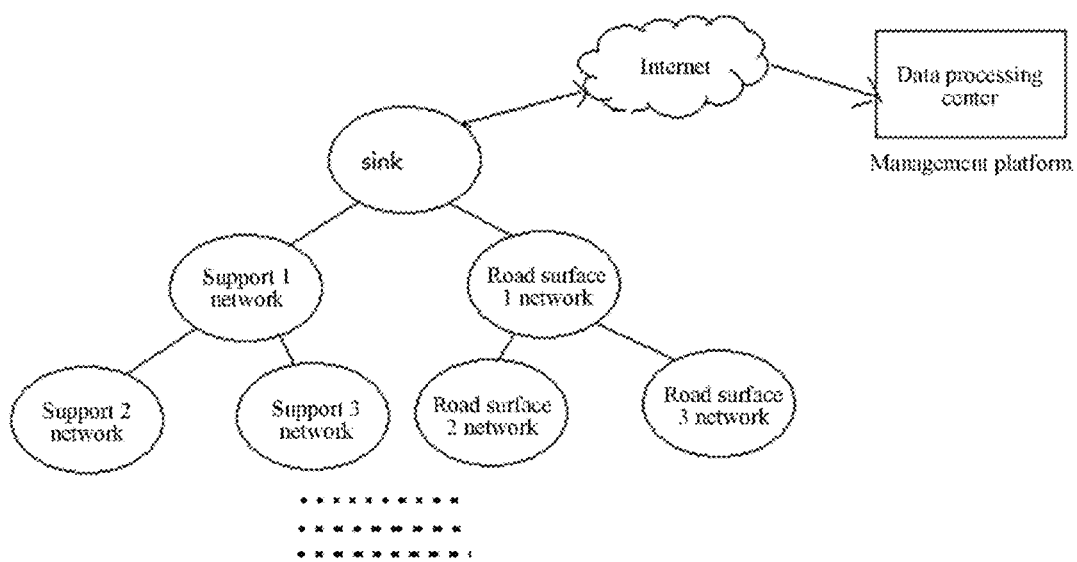
FIG. 9 is the flowchart of node information transmission.

According to the building stress balance real-time monitoring method by using the smart pebble network in the present invention, the stress condition of the building and the safety condition thereof can be monitored in real time. According to the acquired stress information, whether the current building is in the normal safety state is determined, and if the stress is not balanced, that is, the stress of the side surface is too large, and thus exceeds the bearing range thereof, the alarm warning is given to deal with the situation in time, as shown in FIG. 9. The user of the smart pebble reduces the waste of energy and resources, and prolongs the life cycle of the sensor. The method is applied to house buildings and bridge buildings, so as to greatly increase the safety of the buildings.

In the present invention, the passive pressure sensors are made into the "smart pebbles", and are embedded into the building to monitor the stress on the supporting interface of each building in the building construction and bridge construction in real time, the system can immediately give the alarm when the stress in the certain area of the building is seriously beyond the stress range thereof, and the early-warning indicator light flickers to give the alarm. The waste of battery energy of the sensor is reduced while achieving monitoring the stress on the main supporting interface of the building in real time, thereby effectively improving quality safety of the building. The monitored area can be monitored all days without blind spots. The limitations of using existing sensors in buildings are overcome.

In the present invention, transmission of data is performed by using the passive sensor and the passive sensor network, the radio frequency signal in the environment is obtained and converted into electric energy to provide energy for the sensor, thereby reducing the waste of money. In this way, the sensor can operate all the time, thereby prolonging the life cycle of the sensor network. Moreover, the smart pebble can be embedded into the building due to the shape, the stress condition of the building can be more truly detected, and the safety status of the building can be monitored in real time.

The pressure sensor is also called as the weighing sensor. The smart pebble network having high sensitivity to pressure and consisting of the large number of pressure sensors in the passive form can acquire the overall stress information of the building or bridge, and provide data for construction safety in the building or building quality testing or predicting the service life of the building, and the like. The smart pebble acquires data in the active state and harvests energy in the sleep state, and the smart pebble network can operate continuously all the time. The huge data acquisition and detection potential enables the smart pebble to have the great application prospect in detection of overall stress information of the bridge structure or safety information of the building. Moreover, compared with conventional battery sensors, the passive sensor module is used to reduce battery replacement and consumption and reduce the maintenance costs. The principle of hardware technology on which the present invention is based is mainly the communication technology of the sensor network. The innovation point of the present invention in applications is mainly reflected in: the smart pebbles being embedded into the stress interface of the building to acquire stress data; and data transmission technology in the smart pebble network.

However, it is difficult for data transmission between sensor nodes to achieve time synchronization, because data acquisition rates, the energy harvesting rates, and the time for energy harvesting, and the like between the nodes are different. Therefore, it is prone to the problems such as loss in data transmission and collision between the nodes. In the present invention, for the problem occurring in the network, provided are the time synchronization mechanism and role conversion technology, so as to achieve data transmission between the sensor nodes and improve the accuracy of data transmission.

Examples 2: FIG. 1 shows the structural diagram of the smart pebble, which consists of the pressure sensing module 1, the data transmission rod 2, the radio frequency signal acquisition module 3, and the pressure sensor module 4. The pressure sensing module 1 senses pressure information, and transmits same to the pressure sensor module 4 by means of the data transmission rod 2. The pressure sensor module 4 performs converts and analyzes the pressure information into data by using electric energy provided by the radio frequency signal acquisition module 3, and uploads the data to the routing network by means of the built-in antenna for processing. If the electric capacity of the radio frequency signal acquisition module 3 is less than the certain threshold, the pressure sensor module 4 enters the sleep state to acquire the radio frequency signal and converted same into electric energy. When the stored electric energy reaches the high threshold, the pressure sensor module 4 switches from the sleep state to the active state and performs data acquisition.

The following is the core algorithm content of the present invention:

a first algorithm, the time synchronization mechanism: time is divided into slots, frames, adjustment time, and superframes. Each frame includes multiple notches, and each slot can transmit and receive independently. The problem of inability to transmit data is caused by time non-synchronization between adjacent nodes, and the problem is solved by changing the superframe size in one node while keeping the superframe size unchanged in the other node. There are two situations between adjacent parent and child nodes: one is that the superframe size of the child node is greater than that of the parent node. The other one is that the superframe size of the parent node is greater than that of the child node.

Figure 2A:
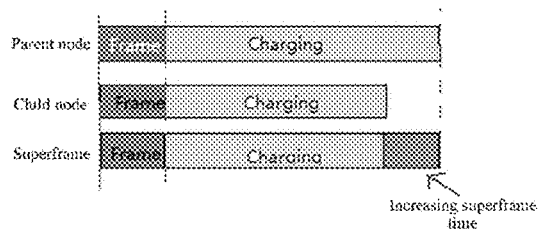
FIGS. 2(a) and 2(b) are the schematic diagram of superframe adjustment, wherein FIG. 2(a) relates to the frame adjustment when the charging rate of the child node is greater than that of the parent node, and FIG. 2(b) relates to the frame adjustment when the charging rate of the child node is lower than that of the parent node.

For the first situation, as shown in FIG. 2(a), when the charging rate of the child node is quicker than that of the parent node, the size of the child superframe is smaller than that of the parent superframe. In this situation, we add another small duty cycle at the tail of the existing superframe to extend same, and within the duty cycle of this extension, the child node wakes up and starts to consume predetermined energy, and then returns to the sleep state and starts to be re-charged. It is ensured that energy at the start of the duty cycle period equals energy at the end, such that the superframe sizes of the parent and child nodes are ensured to be equal, and the nodes can be ensured to be time-synchronized.

Figure 3:
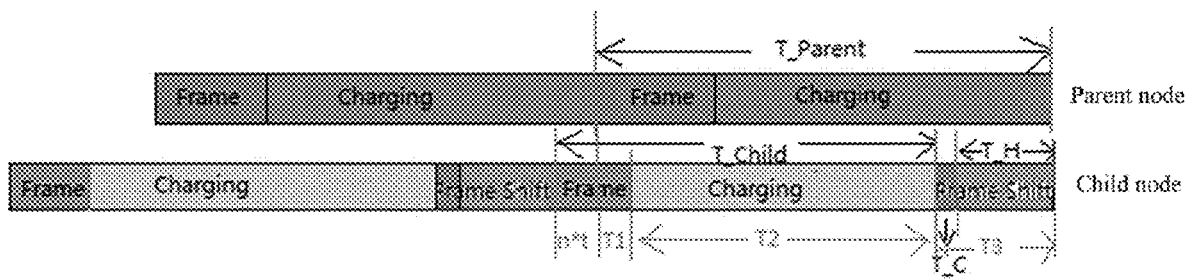
FIG. 3 is the schematic diagram of the superframe extension.

Specific practice: the child node receives the beacon message from the parent node, and the beacon message includes information about superframe time of the parent node, and is used for determining start time of the next frame of the parent node. Now, the child node uses this information, and check how the child node adjusts the superframe thereof, such that start time of the frame of the child node is aligned with that of the parent node. If the superframe size of the parent node is greater than the superframe size of the child node, the child node determines to extend the superframe thereof. As shown in FIG. 3, before the child node receives the beacon message, the beacon message has been transmitted in the frame for time of n*t. T1 is remaining time in the current frame, and T2 is sleep time in the duty cycle. T3 is time occupied by the secondary duty cycle. T3 is also divided into Tc and Th, where Tc is time taken by consuming some energy, and Th is time needed for harvesting these energy. We need to calculate time Tc for the child node to consume the energy.

The formula is derived as follows:

Time T3 is the sum of Tc and Th, and time Tparent taken for the parent node to start the next frame is the sum of T1, T2, and T3, i.e., $T1+T2+T3=T\text{parent}$ $T1+T2+Tc+Th=T\text{parent}$  formula 1

Energy consumed within the secondary duty cycle or adjustment time has to equal energy harvested within the same duty cycle, i.e.:

$Ec=Eh, Tc*Rc=Th*Rh$ $$Th = \frac{Tc*Rc}{Rh}$$  formula 2

Formula 1 is brought into Th to obtain:

$$T1+T2+Tc+\frac{Tc*Rc}{Rh}=T\text{parent}$$  formula 3

In addition, the total time taken by the child node in the superframe equals the sum of time that has been taken by the child node, the remaining time in the current wake-up state, and time needed for the child node to be fully charged, i.e.:

$T1+T2+(n*t)=T\text{child}$  formula 4

Formula 3 is brought into formula 4 to obtain:

$$T\text{child} - (n*t) + Tc + \frac{Tc*Rc}{Rh} = T\text{parent}$$

$$Tc*\left\{1+\frac{Rc}{Rh}\right\} = T\text{parent} - T\text{child} + (n*t)$$

$$Tc*\left\{\frac{Rh+Rc}{Rh}\right\} = T\text{parent} - T\text{child} + (n*t)$$

The following formula is finally obtained after arrangement:

$$Tc = \frac{T\text{parent} - T\text{child} + (n*t)}{Rh+Rc}*Rh.$$  formula 5

By using formula 5, the child node can extend the superframe thereof to be aligned to the parent node.

Figure 2B:
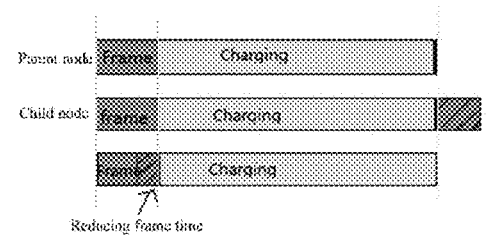
Figure 4:
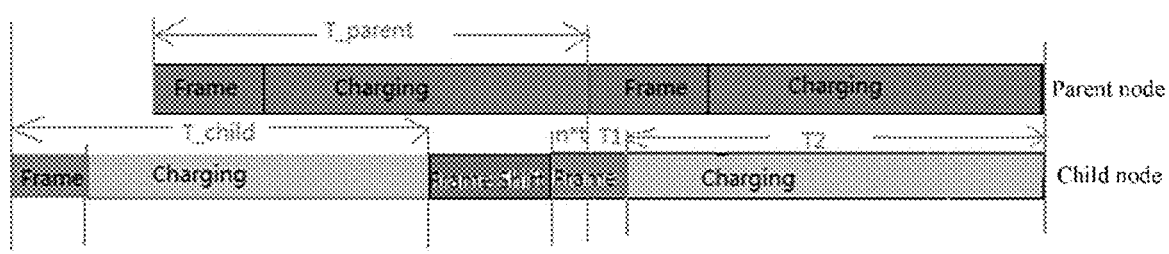
FIG. 4 is the schematic diagram of the superframe reduction.

For the second situation, as shown in FIG. 2(b), when the size of the child superframe is greater than that of the parent superframe, the size of the frame needs to be reduced to achieve synchronization between the nodes. Specific practice is as follows: in order to enable the child node to be aligned to the parent node, the child node needs to shrink the duty cycle thereof, as shown in FIG. 4. When beacon information is received, the time of nt of the frame has passed for the child node, and certain energy is left. After the energy is left, the child node needs to calculate how long the child node needs continue the current frame before being aligned to the parent node. T1 is the time for the child node to continue the current frame and consume energy, and T2 is the time needed for the child node to be fully charged.

The derivation formula of T1 is as follows:

It can be known from FIG. 4 that:

$T1+T2=T\text{parent}$  formula 6

When the beacon message is received from the parent node, the remaining energy (ELeft) in the child node may be calculated from energy having been consumed by the child node in the current frame. This is expressed by the following formula:

$E\text{left}=E\text{full}-(n*t)*Rc$  formula 7 the sum of the energy which is consumed and harvested by the child node and the remaining energy has to equal all charges. That is:

$E\text{full}=E\text{left}-(T1*Rc1)+(T2*Rh1)$  formula 8

Formula 7 is brought therein to obtain:

$E\text{full}=\{E\text{full}-(n*t)*Rc\}-(T1*Rc1)+(T2*Rh1)$ $T1*Rc1=(T2*Rh1)-((n*t)*Rc)$ Formula 6 is brought therein, to obtain:

$T1*Rc1=\{(Tparent-T1)*Rh1\}-((n*t)*Rc)$ $T1*\{Rc1+Rh1\}=(Tparent*Rh1)-((n*t)*Rc)$ $$T1 = \frac{\{(Tparent*Rh1) - ((n*t)*Rc)\}}{Rc1 + Rh1} \quad \text{formula 9}$$

By means of formula 9, the child node may shrink the superframe thereof to be aligned to the parent node.

In the formula, n is the number of periods of operation, t is time of each period, Ec is energy that is consumed, Eh is energy that is harvested, Rh is the energy harvesting rate, Rc is the energy consumption rate, Eleft is the remaining energy, and Efull is the total energy, Tchild is the total time taken by the child node in the current superframe, Rc1 is the energy consumption rate for the child node to continue the current frame, and Rh1 is the energy harvesting rate for the child node to continue the current frame.

Figure 5A:
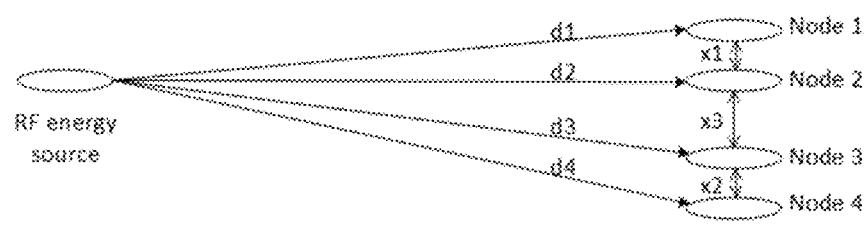

A second algorithm, the role conversion mechanism, is as follows: the role conversion mechanism is the important improvement, and one node can perform data transmission with the lower or higher layer node at the same time. As shown in FIG. 5(a) below, in order to send data from the node 4 to the node 2, the node 4 must forward the data to the node 3. The node 3 stores the data in the buffer area, and then transfers the data to the node 2. This is the continuous message stream, and the message can be transferred to one node at the time. Therefore, the node must play two different roles, i.e., the parent node and the child node. First, the node 3 acts as the parent node and receives the data packet of the node 4, and then switches the role into the child node and forwards the data packet to the node 2. In our method, one node can play any one of the two roles according to specific conditions. The size of the buffer area of the node is used for deciding the role that the node needs to play. When the space of the buffer area in the node is idle and can receive data from other nodes, the node acts as the parent node. Similarly, when the buffer area of the node is full and cannot receive more data packets, the node acts as the child node. In this situation, the child node needs to send data to the parent node, so as to release the space of the buffer area. The threshold for switching from the parent role to the child role is 80% of full capacity, and the threshold for switching from the child role to the parent role is 10% of the full capacity. The upper threshold is set to reserve the certain buffer area to receive its own sensory data, and the lower threshold is set to maximize the data transmission.

Figure 5B:
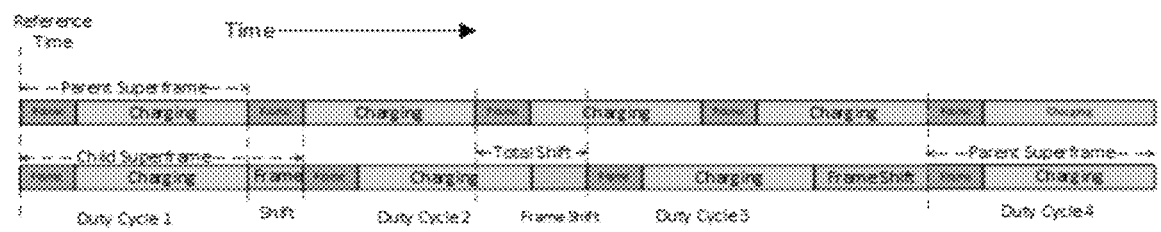

Specific conversion is as follows:

FIG. 5(b) shows the example of the node that completes role switching within four working cycles. At the beginning, a node fixed a reference point in the time dimension while acting as the parent node. The duty cycle shown in the first line is only for reference, to demonstrate the shift of the duty cycle due to frame shifting. The duty cycle shown in the second line is the actual duty cycle used by the node. After the node is converted into the child node, the original child node of the node may still wait to communicate with same. At this time, the node needs to record its own frame shift, thereby facilitating switching back to the original parent node state, and communicating with the original child node. During the first two working cycles in the figure below, the node is in the child node state, and executes the two-frame shift to search for the parent node. Then in the task cycle 3, the node prepares to switch to the parent role. Now the node needs to calculate the frame shift it needs, thereby facilitating re-adjusting the node to return to the reference point thereof. The frame shift is provided by formula 10:

Shift=Minimum Duty Cycle Time−Total Frame Shifts     formula 10

Shift is the shift that is performed when the child node is converted into the parent node, Minimum Duty Cycle Time is the minimum operating period, and Total Frame Shifts is total adjustment time.

Algorithm Pseudo-Code:
    initialization E0=0, T=1, En=0, H=0, and Et={ }
    setting: z (the magnitude of stress of the building), and Eh (a power capacity of the node)
    1: loop
    2: obtaining energy E(t) at the time point t
    3: if E(t)>Eh
    4: data acquisition
    5: else
    6: continuing to harvest energy
    7: end if
    8: obtaining time information of the neighbor node
    9: calculating the time difference tc
    10: calculating secondary duty cycle information (formula 5 and formula 9) of the node
    11: loop:
    12: node data transfer (role conversion)
    13: if Ht>z
    14: monitoring unbalanced stress, the system giving the alarm indication
    15: letting H=0
    16: re-acquiring stress data
    17: else
    18: adding E(t) to Et
    19: end if
    20 t=t+1
    21: end loop
    22: end loop The described smart pebble acts as the monitoring system. The method for monitoring in the building is divided into three steps in total, i.e., node arrangement in the building and design of the network routing, time synchronization and data transmission of smart pebble nodes, and the automatic alarm mechanism for pressure detection. The design of the structure effectively solves the wiring arrangement problem in conventional wired sensors and the battery waste problem in wireless sensor networks. By inlaying intelligent nodes, the real-time stress condition of the whole bridge can be more truly detected, such that bad events (stress imbalances or bridge damage) are predicted, emergencies are dealt with in time, and accidents are avoided.

Figure 6A:
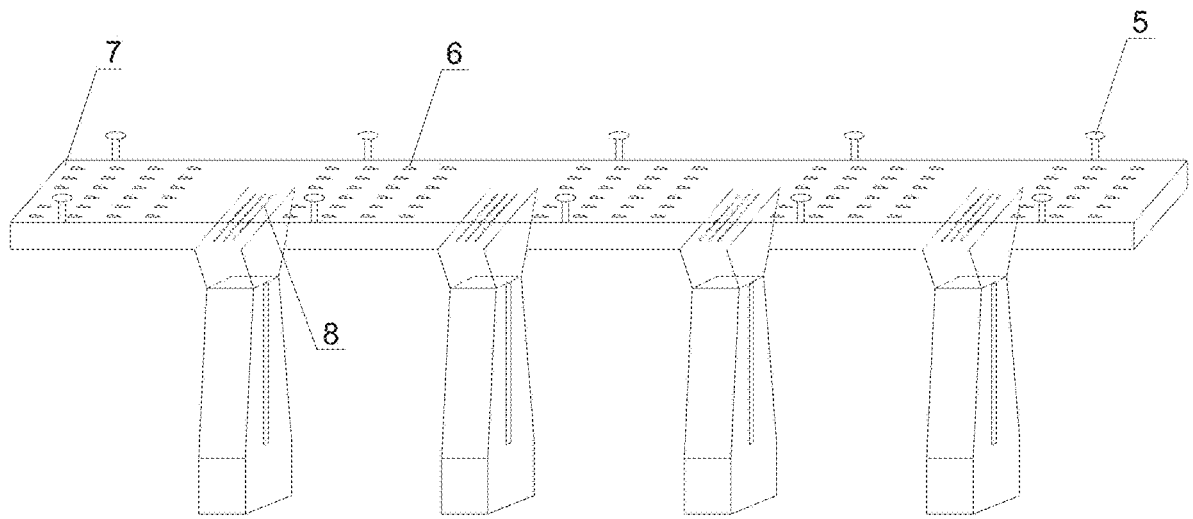
Figure 6B:
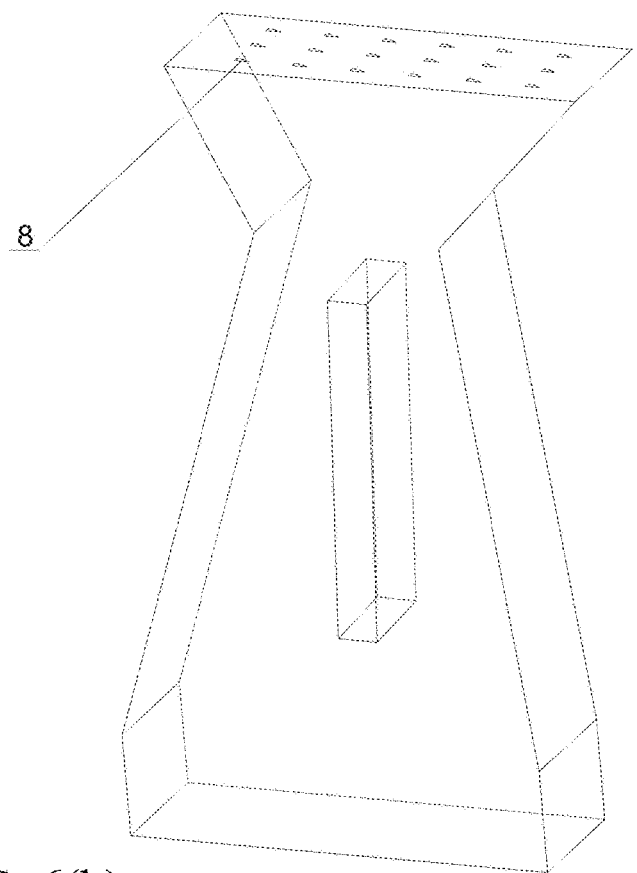
Figure 6C:
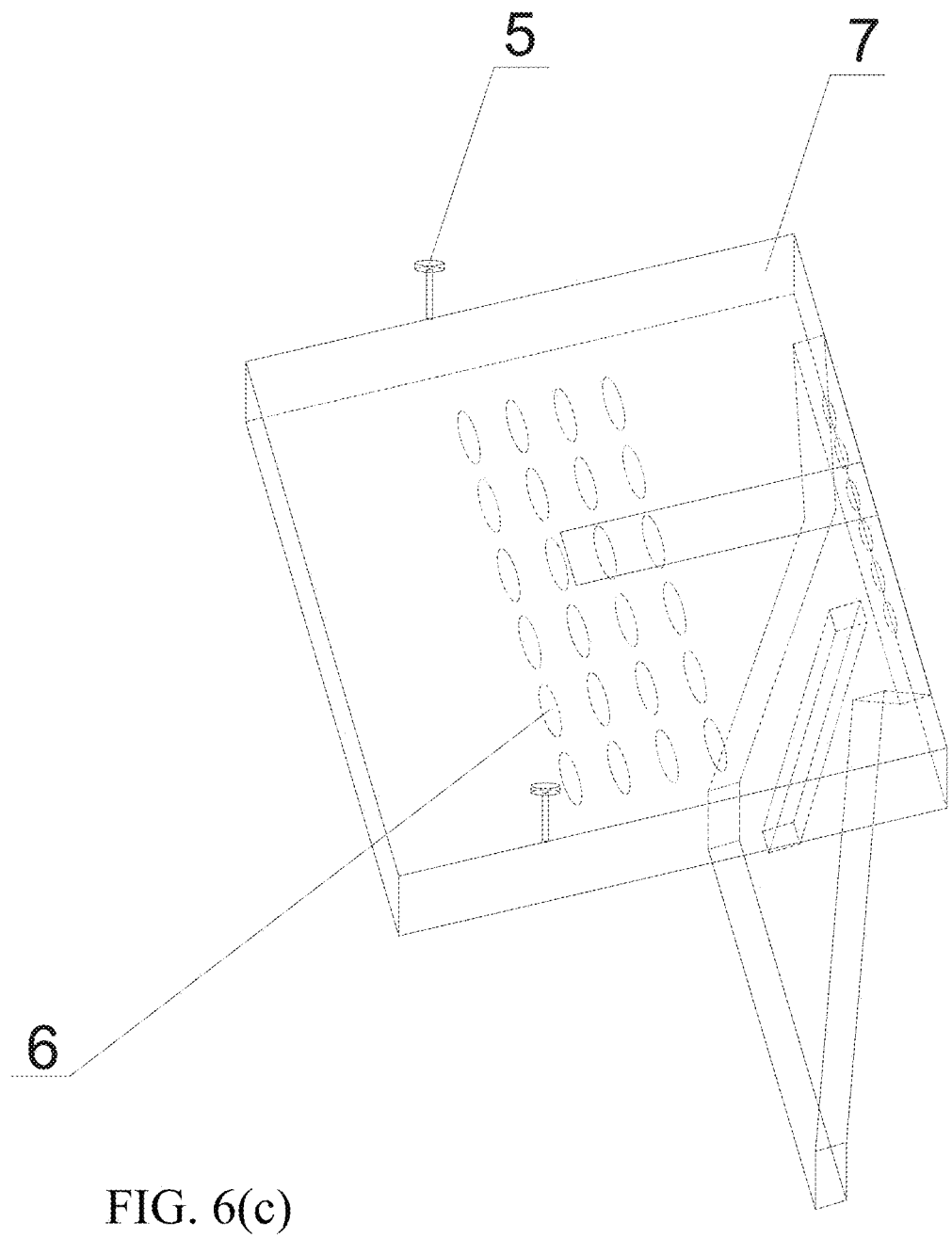

Step 1: Node Arrangement in the Building and Design of the Network Routing:

1.1. Node arrangement: in this part, the smart pebble nodes are required to be arranged in the same building surface of the building, the nodes can be inlaid into the building, or the smart pebbles are inlaid in the supporting surface of the bridge, the nodes are evenly arranged, and certain distances are kept between adjacent nodes. For example, FIG. 6(a) is the part of the structure of the bridge, including the early-warning indicator light 5, the road surface node network 6, the bridge surface 7, and the support node network 8, FIG. 6(b) represents the smart pebble arrangement diagram of the support in the bridge, for example, the support node network 8, and FIG. 6(c) is the smart pebble arrangement diagram of the road surface in the bridge, including the early-warning indicator light 5 on the bridge surface 7. The smart pebbles mainly detect the stress of the bridge support and the bridge span road surface part, the bridge support is the main supporting point, more smart pebble nodes are distributed on the support part of the bridge, the stress condition of the support is obtained, the bridge support is divided into the left part and the right part, as shown in FIG. 6(*b*), the same smart pebbles are distributed on the left part and the right part, and whether the stress of the support is balanced is determined by analyzing the stress of the two parts. The same smart pebbles are evenly distributed in the bridge span road surface part, which is also divided into the left part and the right part as those of the support. In the later data acquisition, the stress of the two parts is acquired, and the stress of the relative positions on the left part and on the right part is compared, and the magnitudes of the stress of the nodes are compared to analyze whether the stress of the bridge is balanced.

Figure 7A:
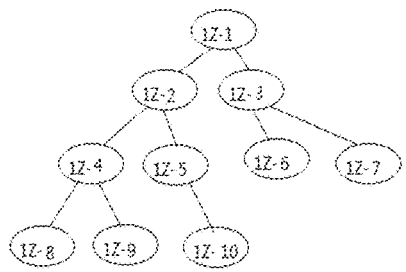
Figure 7:
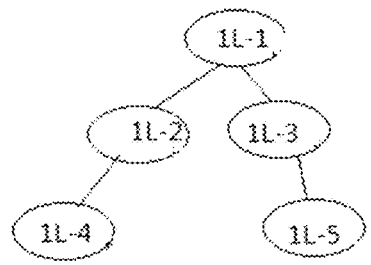
Figure 7C:
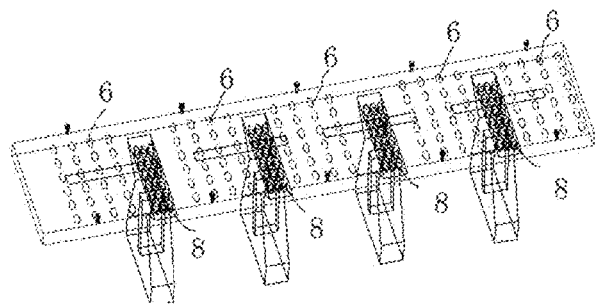
Figure 7D:
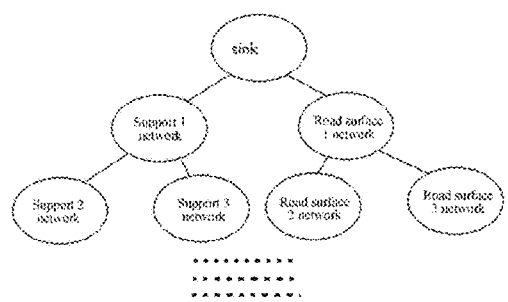

1.2. Generation of the network routing: after the node arrangement is completed, the smart pebble node needs to acquire the radio frequency signal to perform energy storage. After the node energy storage is completed, node positioning technology is used for node positioning, and then the tree-shaped network routing is constructed. The data transmission process of the smart pebbles is similar to the tree-shaped structure, i.e., both relating to transmitting data from the child node to the parent node, the parent node transmits the data to the management platform, and the tree-shaped routing is easily extended. As shown in FIG. 7(*a*), this is the routing consisting of smart pebble nodes of one support, and each node consists of the support number-a support code-a node number, such that which routing of which support this network is can be clearly distinguished. If the routing is required to be added again, the node can be added to the child node of the routing network, thereby facilitating extension. As shown in FIG. 7(*b*), this is the routing consisting of smart pebble nodes of one road surface, one bridge is supported by many supports, there is the section of road surface between every two supports, this section of road surface forms one smart pebble network, the routing is established, and the node consists of the road surface number-a road surface code-a node number, such that which position the road surface is in the bridge can be clearly distinguished, and the position can be found quickly when the stress warning is given. Finally, all the supports and all the road surfaces form the large network, e.g., road surface node network 6 and support node network 8, as shown in FIG. 7(*c*) to finally form the overall routing, as shown in FIG. 7(*d*), and the stress of the whole bridge is analyzed by means of data transmitted by means of each network. According to the established network routing, the node transmits data by means of the routing to the administrator. For example, in FIGS. 7(*a*)-7(*d*), the node in the certain network transmits data to the network routing, then transmits by means of the parent routing on the routing network, always transmits upwards, and finally transmits to the management platform by means of the sink node and the Internet, and the management platform performs processing according to data information.

Step 2:

In this par, the state of each node, i.e., the sleep/wake-up state and energy usage information, is obtained first. After the network is formed, the nodes need to learn information of adjacent nodes, which is obtained by sending out the information signal. The operation of the nodes is performed in the wake-up state, the nodes in the network have respective data transmission slot numbers, and each operation period is allocated according to the number of hops of the routing. The smart pebble nodes first acquire stress information of the building, then store the stress information into the local cache, and sense the synchronization period of neighbor nodes. Time synchronization is performed by means of formula 5 and formula 9, and then according to the size of data of the nodes and the distance between the neighbor nodes, whether the consumed energy is greater than the remaining energy of the nodes is determined. Then the node performs data transmission according to the size of the cache area by using the role conversion mechanism.

Figure 8:
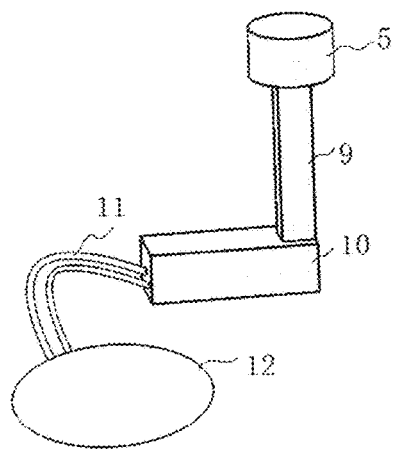
FIG. 8 is the structural schematic diagram of the early-warning indicator light.

Step 3:

Operating Process of the Early-Warning Indicator Light:

This part mainly relates to giving the early-warning and alarm after stress analysis of the bridge, and the early-warning indicator lights are provided at entrances of two ends of the bridge and at positions on two sides of each section of the road surface. The structure of the early-warning indicator light is as shown in FIG. 8, and consists of the capacitor 10, the early-warning indicator light 5, and the smart pebble 12. FIG. 8 further shows the supporting rod 9 between the capacitor 10 and the early-warning indicator light 5, and the power cord 11 between the capacitor 10 and the smart pebble 12. According to the smart pebble in this structure, the radio frequency signal is acquired, and is converted into electric energy for storage in the capacitor, when it is detected that the power of the capacitor is lower than the certain storage capacity, the smart pebble performs energy harvesting, or otherwise, enters the sleep state. Moreover, the analysis result given by the management platform and warning information of the road surface network are received, and if the part of the road surface is overloaded, the light alarm is given.

Support early-warning: first, the smart pebble nodes on two ends of the same support acquire stress, and determines, by comparing the acquired stress and pressure that the support can bear, whether load-bearing stress is overloaded. If the stress is overloaded, the overloading warning is uploaded to the management end, and the early-warning indicator lights on the two ends of the support turn yellow. If the stress is overloaded continuingly, the early-warning indicator lights turn red, and the data is uploaded to the management end for processing. If the stress of other supports is balanced (within the normal range), the lights turn green.

Road surface early-warning: data on the same section of road surface is detected, if the certain side or the certain area on the road surface is overloaded, the early-warning indicator lights on two ends of the road surface turn yellow, and if the stress is overloaded continuingly, the early-warning indicator lights turn red, and the data is uploaded to the management end for processing.

Early-warning at two ends of the bridge: if the stress of the certain section of support or road surface network is overloaded continuingly, the early-warning lights on two sides of the bridge turn red, the driver can know according to the early-warning lights that the bridge is overloaded, and then is prohibited to drive on the bridge, so as to avoid the danger of bridge damage caused by stress overload.

Bridge usage prediction: data uploaded by each support network and road surface network is stored, the data is analyzed by means of big data technology to obtain the change diagram of the stress on the bridge, the service life of the bridge can be predicted, such that dangerous accidents caused by long-term usage of the bridge can be prevented in advance.

According to the building stress balance real-time monitoring method by using the smart pebble network in the present invention, the stress condition of the building and the safety condition thereof can be monitored in real time. According to the acquired stress information, whether the current building is in the normal safety state is determined, and if the stress is not balanced, that is, the stress of the side surface is too large and thus exceeds the bearing range thereof, the alarm warning is given to deal with the situation in time, as shown in FIG. 9. The smart pebble is used, so as to reduce the waste of energy and resources, and prolong the life cycle of the sensor. The method is used in house construction and bridge construction to greatly increase the safety of the buildings.

The above are only preferred specific examples of the present invention, but the scope of protection of the present invention is not limited to this. Any person skilled in the art can make equivalent replacements or changes according to the technical solutions of the present invention and the inventive concept thereof within the technical scope disclosed in the present invention, which should all fall within the scope of protection of the present invention.

The invention claimed is:

1. A building stress balance monitoring system of a passive sensor network, the building stress balance monitoring system comprising:
   a plurality of nodes arranged in a same building surface of a building or arranged in a supporting surface of a bridge,
   wherein
      each of the nodes mainly consists of a pressure sensor module, a radio frequency signal acquisition module, and a network module;
      a sensing surface of the pressure sensing module acquires building pressure information and transmits same to the pressure sensor module;
      the pressure sensor module receives electric energy provided by the radio frequency signal acquisition module, and converts the pressure information into data, which is uploaded to a network through the network module;
      if electric capacity of the radio frequency signal acquisition module is less than a set threshold, the pressure sensor module enters a sleep state, and the radio frequency signal acquisition module acquires a radio frequency signal and converts same into electric energy; and
      when stored electric energy reaches a high set threshold, the pressure sensor module switches from the sleep state to an active state and performs data acquisition or transmission.

2. The building stress balance monitoring system of the passive sensor network according to claim 1, wherein each of the nodes has a pebble-shaped housing, each module is located in the housing, and the sensing surface of the pressure sensing module is part or all of a top surface of the pebble-shaped housing; the pressure sensing module and the pressure sensor module are connected and perform signal transmission through a data transmission rod.

3. The building stress balance monitoring system of the passive sensor network according to claim 1, wherein a time synchronization method for data transmission between the nodes is performed, so that two adjacent nodes are woken up synchronously, data is transmitted between the two adjacent nodes, and a role conversion method is used for data transmission between the two adjacent nodes.

4. The building stress balance monitoring system of the passive sensor network according to claim 1, wherein the two nodes realize data transmission based on following method: two adjacent nodes are synchronously woken up by using a time synchronization method, the two adjacent nodes are time synchronized, and after waking up, the node determines its data cache, if:
   situation 1: the data cache of the node is less than a threshold, the node acts as a parent node, collects data without transmitting same, and calculates whether remaining energy of the node can collect data and make the data cache greater than the threshold;
   A. if the remaining energy cannot be maintained until the data cache is greater than the threshold, calculate a next synchronization wake-up time of the node and a child node adjacent to the node, and when the node runs out of energy, the node enters the sleep state and waits for next time synchronization wake-up; if the remaining energy can be maintained until the data cache is greater than the threshold, then calculate the next synchronization wake-up time of the node and the parent node adjacent to the node, and during this wake-up, if the data cache is greater than the threshold, the node is converted into the child node, transmitting data without collecting data, and when the node runs out of energy, the node enters the sleep state, and waits for the next time synchronization to wake-up;
   situation 2: the data cache of the node is greater than the threshold, the node acts as a child node, transmits data without collecting data, and calculates whether the remaining energy of the node can transmit the data in the data cache until the data cache is less than the threshold;
   if the remaining energy of the node cannot be maintained until the data cache is less than the threshold, calculate the next synchronous wake-up time of the node and a parent node adjacent to the node, when the node runs out of energy, the node enters the sleep state, and waits for the next time synchronization to wake-up; and
   if the remaining energy can be maintained until the data cache is greater than the threshold, calculate the next synchronous wake-up time of the node and the child node adjacent to the node, and during this wake-up, if the data cache is less than the threshold, the node is converted to the parent node collecting data without transmitting data, and when the node runs out of energy, the node enters the sleep state, and waits for the next time synchronization to wake-up.

5. The building stress balance monitoring system of the passive sensor network according to claim 3, wherein the time synchronization method is: there are two situations between the adjacent parent and child nodes: one is a superframe size of the child node is greater than the superframe size of the parent node, and the other is the superframe size of the parent node is greater than the superframe size of the child node; and an adjustment method is to change the superframe size in one node, and keeping the superframe size unchanged in the other node, to achieve time synchronization of the two nodes.

6. The building stress balance monitoring system of the passive sensor network according to claim 5, wherein the synchronization method for the first situation is: when a charging rate of the child node is quicker than the charging rate of the parent node, a size of a child superframe will be smaller than the size of a parent superframe; a beacon message comprising information about superframe time of the parent node is received from the parent node is used to determine start time of a next frame of the parent node; when receiving the beacon information, the child node uses the beacon information to adjust the superframe thereof, such that the start time of the frame of the child node is aligned with the start time of the frame of the parent node; a duty cycle is added at an end of the child superframe to extend same; within the duty cycle of this extension, the child node wakes up and starts to consume a predetermined amount of energy, and then returns to the sleep state and starts charging again, so that the energy at the beginning of the duty cycle is equal to the energy at the end of the duty cycle, the superframe sizes of the parent and child nodes are equal, and the nodes are time-synchronized; a method for calculating the time when the child node to wake up and start to consume the predetermined amount of energy is: before the child node receives the beacon message, the beacon message has been transmitted in the frame for n*t time, Tc is the time taken to consume energy, n is an operation cycle, and t is the time of each cycle; Tc is calculated as follows: T1 is remaining time in the current frame, T2 is sleep time in the duty cycle, T3 is time occupied by a secondary duty cycle, T3 is the sum of time Tc and Th, Tc is time taken to consume some energy, Th is time needed to collect the energy, and time Tparent taken for the parent node to start the next frame is the sum of T1, T2, and T3, i.e., $$T1+T2+T3=Tparent$$

then: $T1+T2+Tc+Th=Tparent$      formula (1)

the energy consumed within the secondary duty cycle or adjustment time must be equal to the energy harvested within the same duty cycle, i.e.: Ec=Eh, Tc*Rc=Th*Rh $$Th = \frac{Tc*Rc}{Rh} \quad \text{formula (2)}$$

Ec is the energy consumed, Eh is the energy harvested, Rh is an energy harvesting rate, and Rc is an energy consumption rate;

formula (1) is brought into Th to obtain:

$$T1 + T2 + Tc + \frac{Tc*Rc}{Rh} = Tparent \quad \text{formula (3)}$$

the total time taken by the child node in the current superframe is equal to the sum of the time the child node has spent, the time remaining in the current wake-up state, and the time needed for the child node to be fully charged:

$$T1+T2+(n*t)=Tchild \quad \text{formula (4)}$$

formula (3) is brought into formula (4) to obtain:

$$Tchild - (n*t) + Tc + \frac{Tc*Rc}{Rh} = Tparent$$

$$Tc * \left\{1 + \frac{Rc}{Rh}\right\} = Tparent - Tchild + (n*t)$$

$$Tc * \left\{\frac{Rh+Rc}{Rh}\right\} = Tparent - Tchild + (n*t)$$

the following formula is obtained after arrangement:

$$Tc = \frac{Tparent - Tchild + (n*t)}{Rh+Rc} * Rh. \quad \text{formula (5)}$$

7. The building stress balance monitoring system of the passive sensor network according to claim 6, wherein the synchronization method for the second situation is: when the charging rate of the child node is slower than the charging rate of the parent node, the size of the child superframe will be larger than the size of the parent superframe; when receiving the beacon information, the child node has passed n*t time of the frame, and left some energy; calculating how long the child node should continue the current frame to align the child node to the parent node, and the child node is aligned with the parent node by shrinking the duty cycle of the child node; a method for calculating how long the child node should continue the current frame to align the child node to the parent node is: T1 is the time for the child node to continue the current frame and consume energy, and T2 is the time needed for the child node to fully charge; T1 is calculated as follows:

$$T1+T2=Tparent \quad \text{formula (6)}$$

when the beacon message is received from the parent node, the remaining energy in the child node is calculated from energy consumed by the child node in the current frame, Eleft is the remaining energy, and Efull is a total energy, expressed by the following formula:

$$Eleft=Efull-(n*t)*Rc \quad \text{formula (7)}$$

the sum of the energy consumed and harvested and the remaining energy of the child node must equal to full charge, i.e.:

$$Efull=Eleft-(T1*Rc1)+(T2*Rh1) \quad \text{formula (8)}$$

formula (7) is brought to obtain:

$$Efull=\{Efull-(n*t)*Rc\}-(T1*Rc1)+(T2*Rh1)$$

$$T1*Rc1=(T2*Rh1)-((n*t)*Rc)$$

formula (6) is brought to obtain:

$$T1*Rc1=\{(Tparent-T1)*Rh1\}-((n*t)*Rc)$$

$$T1*\{Rc1+Rh1\}=(Tparent*Rh1)-((n*t)*Rc)$$

$$T1 = \frac{\{(Tparent*Rh1)-((n*t)*Rc)\}}{Rc1+Rh1}; \quad \text{formula (9)}$$

Rc1 is an energy consumption rate for the child node to continue the current frame; and Rh1 is an energy harvesting rate for the child node to continue the current frame.

8. The building stress balance monitoring system of the passive sensor network according to claim 3, wherein the role conversion method is: a node sending data is a child node, the node receiving the data is to send the data from a first node to a third node, the first node must forward the data to a second node, the second node stores the data in a buffer area, then the second node transfers the data to the third node, as a continuous message stream, the data can only be transferred to one node at a time, and the second node has two different roles in data transfer, a parent node and a child node; first, the second node is in the role of the parent node which receives the data packet sent by the first node in the role of the child node; then the second node converts the role thereof to the child node, and forwards the data packet to the third node which acts as the parent node; during the process, the second node makes a role conversion in the process, the second node plays one of the two roles in different time according to specific conditions, and determines the role that the second node currently needs to play according to the size of the buffer area of the second node; when the space of the buffer area in the second node is free and can receive data from other nodes, the second node acts as the parent node, and receives data transmitted by the child node thereof; and when the buffer area of the second node is full and cannot receive more data packets, the second node acts as the child node, and the second node which as the child node sends data to the parent node to release the space of the buffer area.

9. The building stress balance monitoring system of the passive sensor network according to claim 8, wherein at the beginning, the node fixes a reference point in a time dimension when acting as the parent node; after the node is converted from the parent node to the child node, the original child node of the node may still wait to communicate with same, and the node needs to record its own frame shift, and readjust itself back to the reference point thereof, to switch back to the original role of the parent node, and communicate with the original child node again;

a method for calculating the frame shift is:

$$\text{Shift} = \text{Minimum Duty Cycle Time} - \text{Total Frame Shifts}$$

Shift is a shift of movement when the child node is converted into the parent node, Minimum Duty Cycle Time is a minimum duty cycle, and Total Frame Shifts is total adjustment time.

* * * * *